United States Patent
Chen et al.

(10) Patent No.: US 7,233,505 B2
(45) Date of Patent: Jun. 19, 2007

(54) HIGH EFFICIENCY FLYBACK CONVERTER WITH PRIMARY, SECONDARY, AND TERTIARY WINDINGS

(75) Inventors: Lien-Hsing Chen, Taichung County (TW); Lien-Chien Ke, Taichung County (TW)

(73) Assignee: Power Mate Technology Co., Ltd., Taichung (TW)

( * ) Notice: Subject to any disclaimer, the term of this patent is extended or adjusted under 35 U.S.C. 154(b) by 97 days.

(21) Appl. No.: 10/846,685

(22) Filed: May 17, 2004

(65) Prior Publication Data

US 2005/0219873 A1    Oct. 6, 2005

(30) Foreign Application Priority Data

Apr. 5, 2004    (TW)    ............... 93205177 U

(51) Int. Cl.
*H02M 3/335*    (2006.01)
(52) U.S. Cl. ............ 363/21.16; 363/21.12; 363/21.14; 363/21.15
(58) Field of Classification Search ........ 363/21.16, 363/21.12, 21.14, 21.15
See application file for complete search history.

(56) References Cited

U.S. PATENT DOCUMENTS 6,424,544 B1 *    7/2002    Svardsjo ............... 363/21.12

FOREIGN PATENT DOCUMENTS

JP        06-339266        12/1994

* cited by examiner

*Primary Examiner*—Karl Easthom
*Assistant Examiner*—Richard V. Muralidar
(74) *Attorney, Agent, or Firm*—Bacon & Thomas, PLLC

(57) ABSTRACT

A flyback converter is comprised of a primary side and a secondary side. The primary side includes a primary winding and a switch both connected in series. The secondary side includes a secondary winding, a tertiary winding, a first resistor, a capacitor, a second resistor, and an MOSFET (metal-oxide-semiconductor field-effect transistor). The first resistor, the capacitor, and the second resistor are connected in series and together connected in parallel with the tertiary winding. The MOSFET is connected in parallel with the first resistor at its gate and source. Accordingly, when the switch is turned on/off, the power energy provided at the primary side can be transferred to the secondary side in a flyback manner.

4 Claims, 7 Drawing Sheets

HIGH EFFICIENCY FLYBACK CONVERTER WITH PRIMARY, SECONDARY, AND TERTIARY WINDINGS

BACKGROUND OF THE INVENTION

1. Field of the Invention

The present invention relates generally to electronic circuits, and more particularly to a flyback converter of simple structure and extremely high efficiency.

2. Description of the Related Art

U.S. Pat. No. 6,424,544 disclosed a continuous mode flyback converter, as shown in FIG. 6, in which, an FET (field-effect transistor) 71 provides a voltage drop for a secondary side of a transformer 72 to reduce loss of power energy, such that it is suitable for low voltage applications; besides, it further has DC-blocking CC to further reduce the loss of the power energy. The conventional converter prevents the gate voltage of the FET 71 from becoming zero and rapidly closes the FET 71 via a PNP transistor.

Japanese Publication No. 06-339266 disclosed a flyback converter using MOS transistor as synchronous rectifier, as shown in FIG. 7, in which a secondary side of a transformer 81 has an MOSFET 82 connected to a capacitor 83 and a resistor 84, a primary side of the transformer 81 works with a changeover drive circuit 85 and a diode 86, and a frequency control circuit 87 controls the frequency, such that the output can be controlled by conversion.

SUMMARY OF THE INVENTION

The primary objective of the present invention is to provide a flyback converter, which causes high efficiency by means of simple electronic elements.

The secondary objective of the present invention is to provide a flyback converter, which is structurally simple and low-cost.

The foregoing objective of the present invention is attained by the flyback converter, which is comprised of a primary side and a secondary side. The primary side includes a primary winding and a switch both connected in series. The secondary side includes a secondary winding, a tertiary winding, a first resistor, a capacitor, a second resistor, and an MOSFET (metal-oxide-semiconductor field-effect transistor). The first resistor, the capacitor, and the second resistor are connected in series and together connected in parallel with the tertiary winding. The MOSFET is connected in parallel with the first resistor at its gate and source. Accordingly, when the switch is turned on/off, the power energy provided at the primary side can be transferred to the secondary side in a flyback manner.

BRIEF DESCRIPTION OF THE DRAWINGS

FIG. 2 is a circuit diagram of the first preferred embodiment of the present invention, showing that the switch is turned on;

DETAILED DESCRIPTION OF PREFERRED EMBODIMENTS

Figure 1:
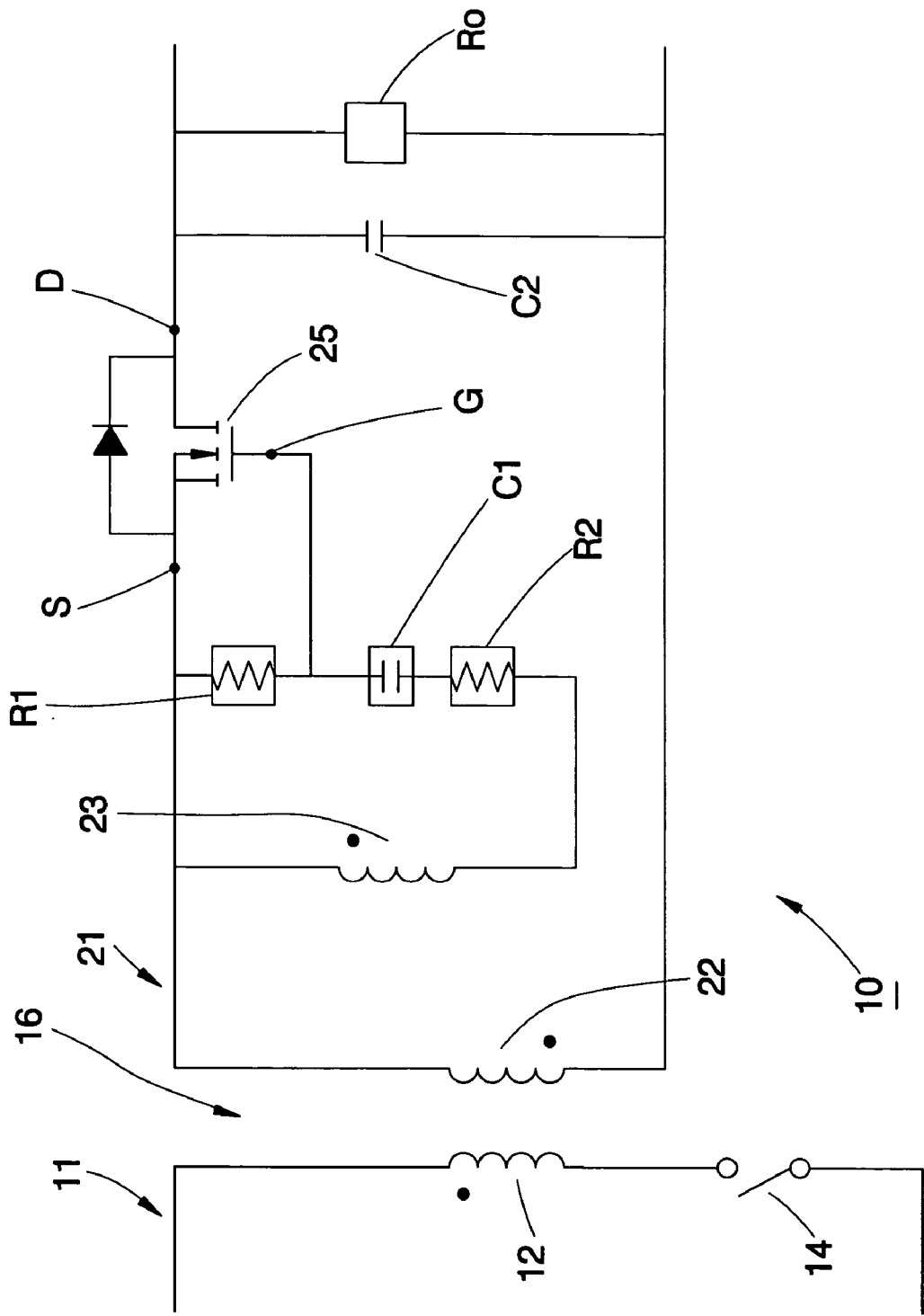
FIG. 1 is a circuit diagram of a first preferred embodiment of the present invention, showing that a switch is turned off.

Referring to FIG. 1, a flyback converter 10 constructed according to a first preferred embodiment of the present invention is comprised of a primary side 11 and a secondary side 21.

The primary side 11 includes a primary winding 12 and a switch 14, which both are connected in series.

The secondary side 21 includes a secondary winding 22, a tertiary winding 23, a first resistor R1, a capacitor C1, a second resistor R2, and an MOSFET 25. The first resistor R1, the capacitor C1, and the second resistor R2 are connected in series to form a series-wound combination, which is connected in parallel with the tertiary winding 23. The MOSFET 25 is connected in parallel with the first resistor R1 respectively at a gate G thereof and a source S thereof, and the source S is connected between the secondary winding 22 and the tertiary winding 23.

The primary winding 12, the secondary winding 22, and the tertiary winding 23 are coils located at two sides of a transformer 16. The primary winding 12 is located at a primary side of the transformer 16. The secondary and tertiary windings 22 and 23 are located at a secondary side of the transformer 16 and connected in series.

In this embodiment, the flyback converter 10 is connected in parallel respectively with an output capacitor C2 and a load Ro, having two ends connected respectively with a drain D of the MOSFET 25 and the secondary winding 22.

Accordingly, when the switch 14 is turned on/off, the power energy at the primary side 11 can be transferred to the secondary side 21 in a flyback manner.

Figure 2:
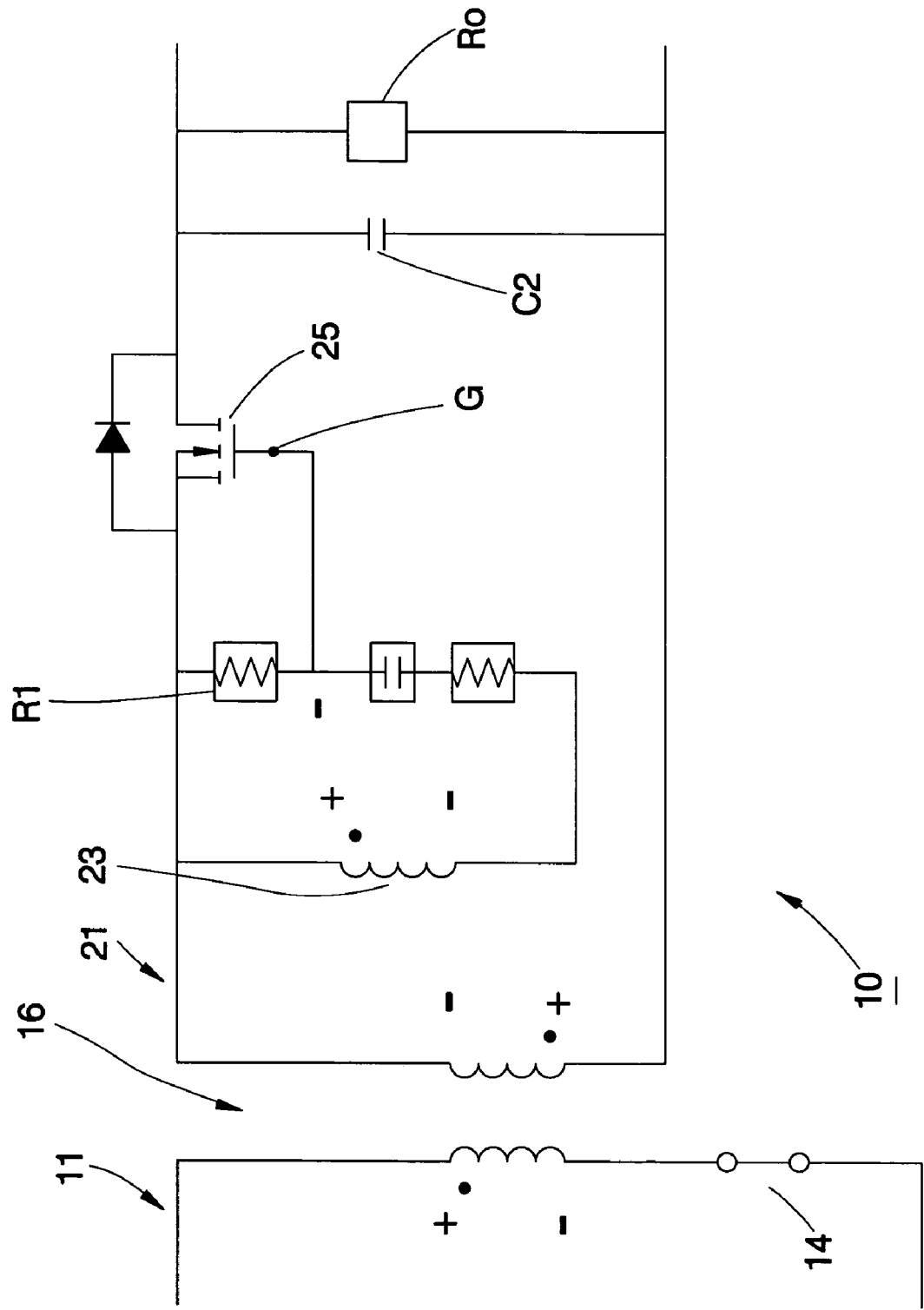
Figure 3:
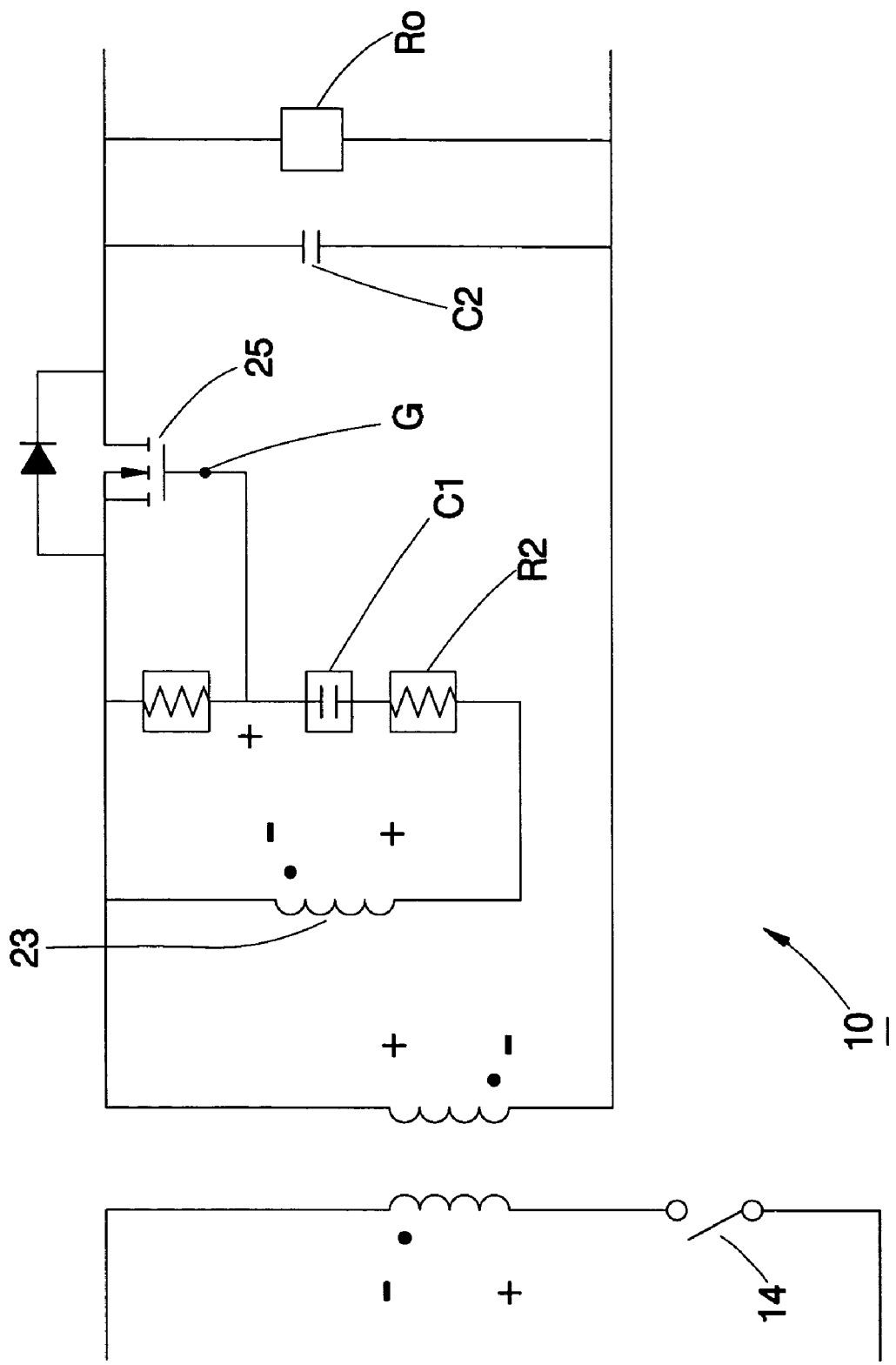
FIG. 3 is a circuit diagram of the first preferred embodiment of the present invention, showing that the switch is turned off.

Referring to FIGS. 2 and 3, when the present invention is operated, the primary side 11 is connected with proper DC (direct current) power. When the switch 14 is turned on, the transformer 16 begins to store the power energy and has the polarity as indicated in FIG. 2. The gate G of the MOSFET 25 is induced by the tertiary winding 23 to be negative, such that Vg<Vs, the MOSFET 25 is closed, and the output provides power energy for the load Ro via the output capacitor C2. The first resistor R1 can be provided to accelerate closing the MOSFET 25 to reduce the loss of the power energy of the secondary side 21.

Referring to FIG. 3, when the switch 14 is turned off, the gate G of the MOSFET 25 is induced by the tertiary winding 23 to be positive, such that Vg>Vs, the MOSFET 25 is open to provide power energy for the output capacitor C2 and the load Ro, and meanwhile, the power energy flows through the tertiary winding 23, the second resistor R2, the capacitor C1, and the gate G of the MOSFET 25, wherein the second resistor R2 can be provided to suppress damping generated while the switch 14 is turned on/off and to reduce EMI (electromagnetic interference). In addition, the MOSFET 25 is characterized by that if Vgs gets larger, Rds(on) will get smaller, such that the capacitor C1 can be provided to reduce the loss of the power energy.

Figure 4A:
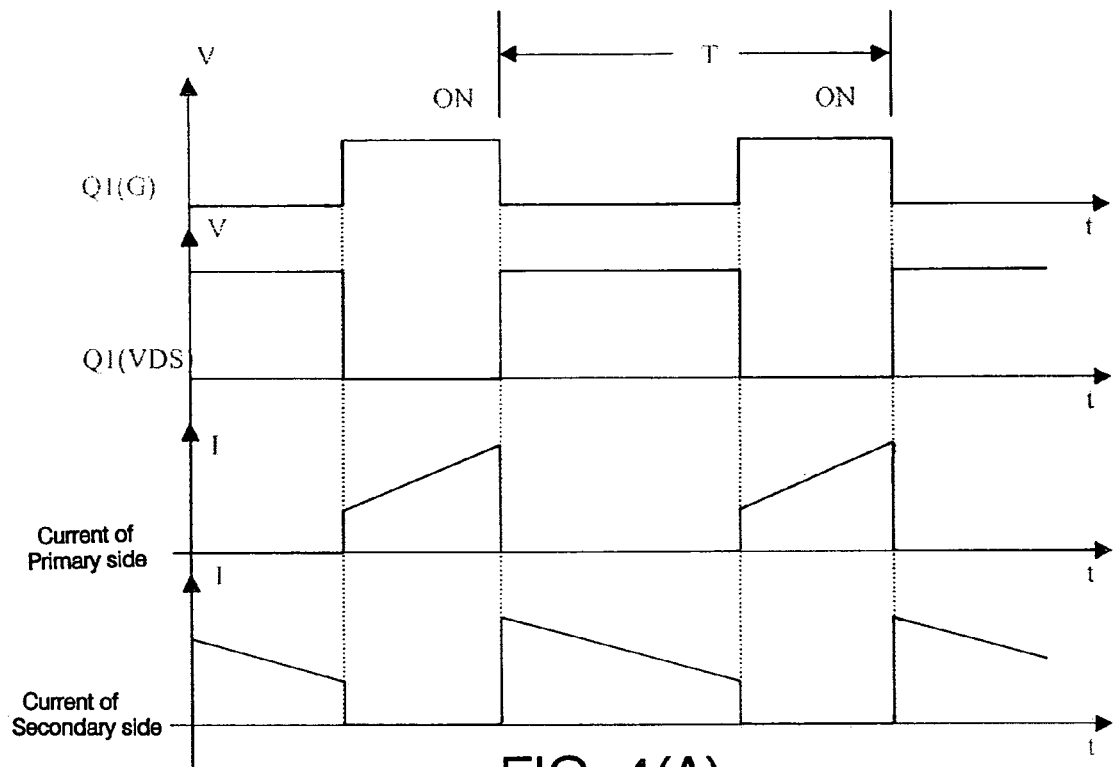
FIG. 4(A) and FIG. 4(B) are oscillograms of the first preferred embodiment of the present invention.
Figure 4B:
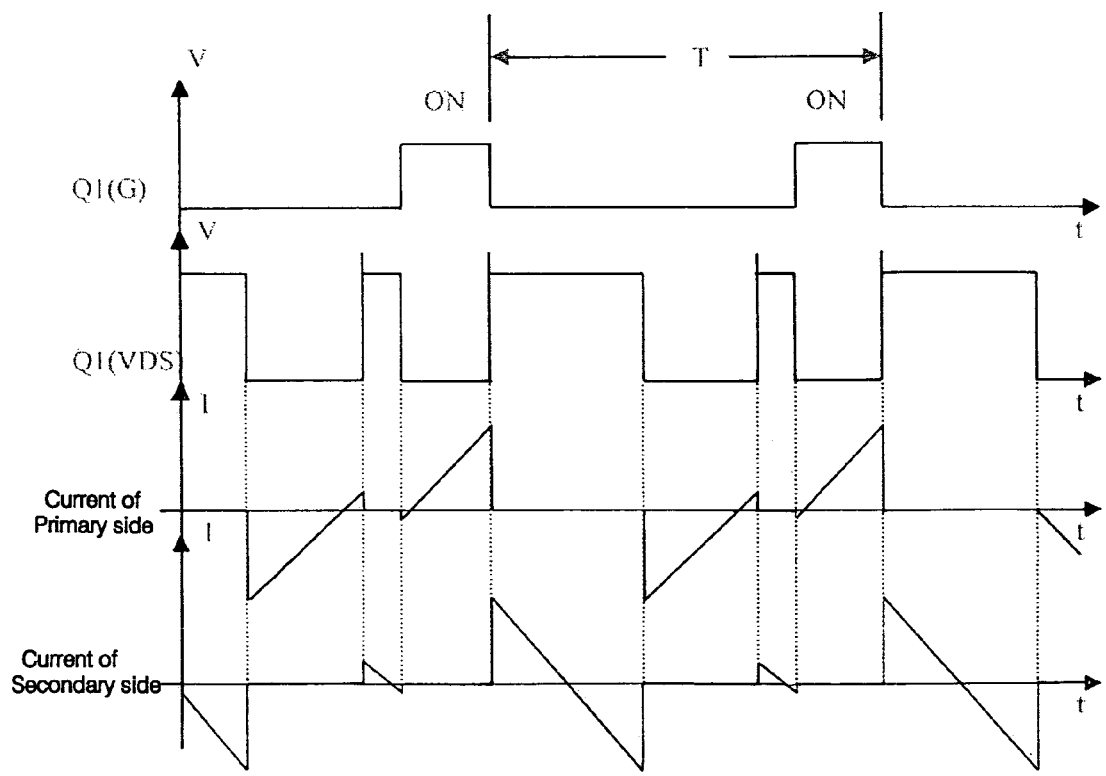

FIGS. 4(A) and 4(B) show the waveforms of the present invention respectively in light-load and heavy-load states; Q1(G) indicates the waveform of the switch 14, and Q1(VDS) indicates the waveform of the voltage between the drain D and the source S of the MOSFET 25. In the light-load state and when the switch 14 is turned off, Vg>Vs causes positive value for Vg−Vs, such that the MOSFET 25 is activated by the gate G to be open. Further, the MOSFET 25 has extremely low Vgs(th), i.e. critical voltage of the Vgs, to be forced to twice changeover during a period. When the MOSFET 25 works in DCM (discontinuous conduction mode), Vgs is larger than Vgs(th), such that MOSFET 25 is forced to be open again to switch DCM to CCM (continuous conduction mode), thereby eliminate the problem of discontinuous current in DCM and causing the present invention to be operated in CCM without conversion in a manner of fixed frequency. Accordingly, the present invention can effectively work whenever it is in heavy-load state or light-load state.

Figure 5:
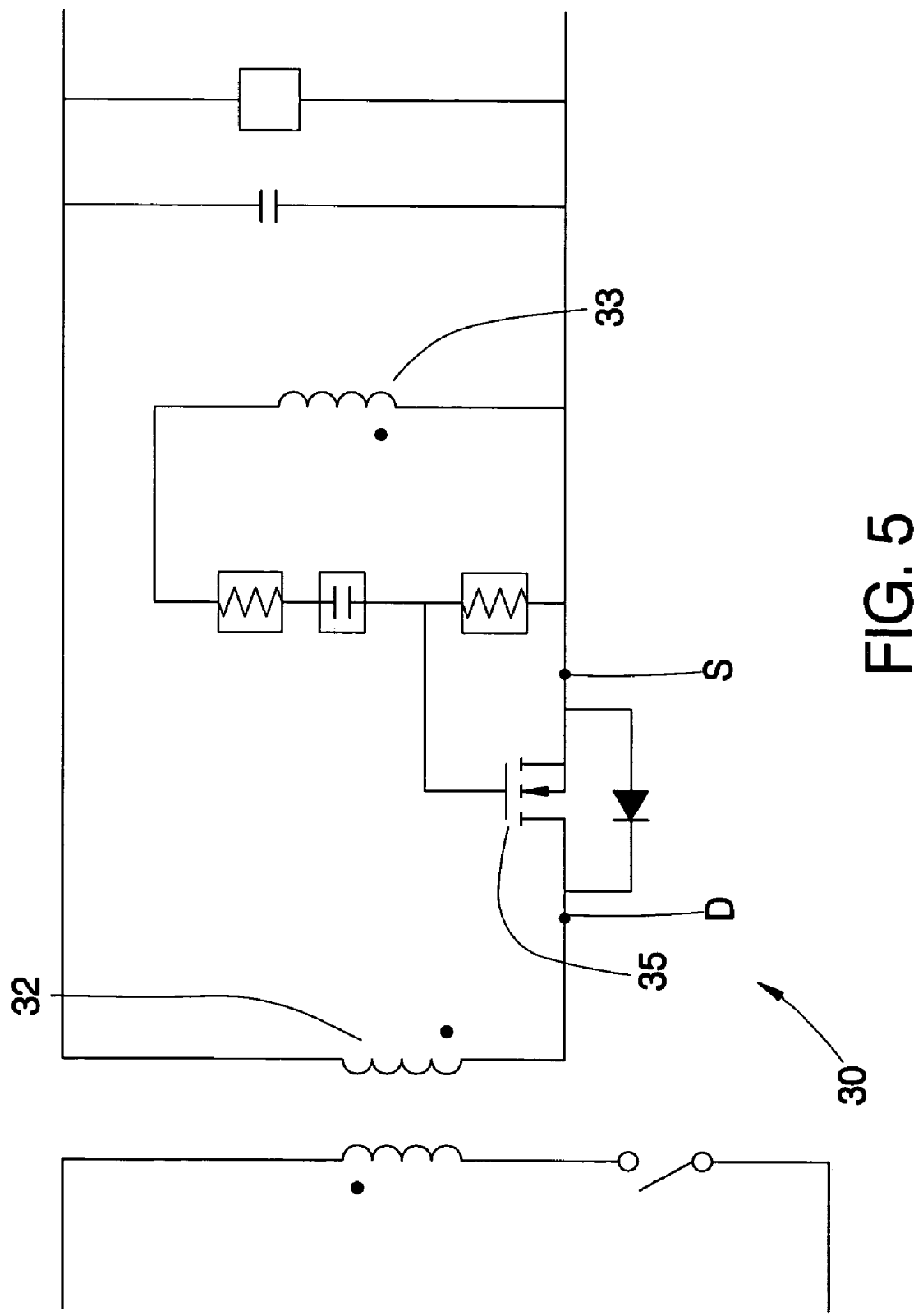
FIG. 5 is a circuit diagram of a second preferred embodiment of the present invention.
Figure 6:
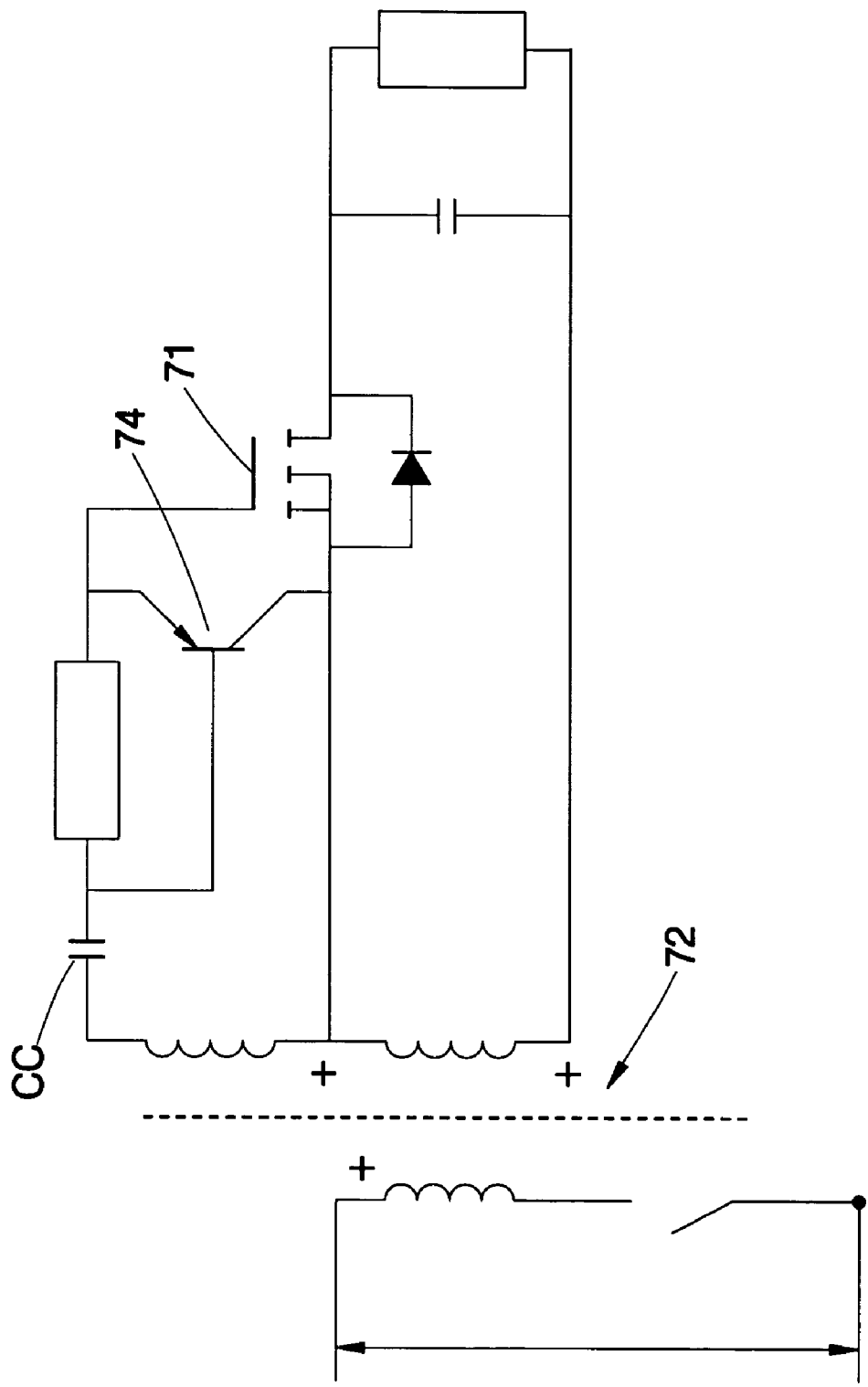
FIG. 6 is a circuit diagram of a prior art.
Figure 7:
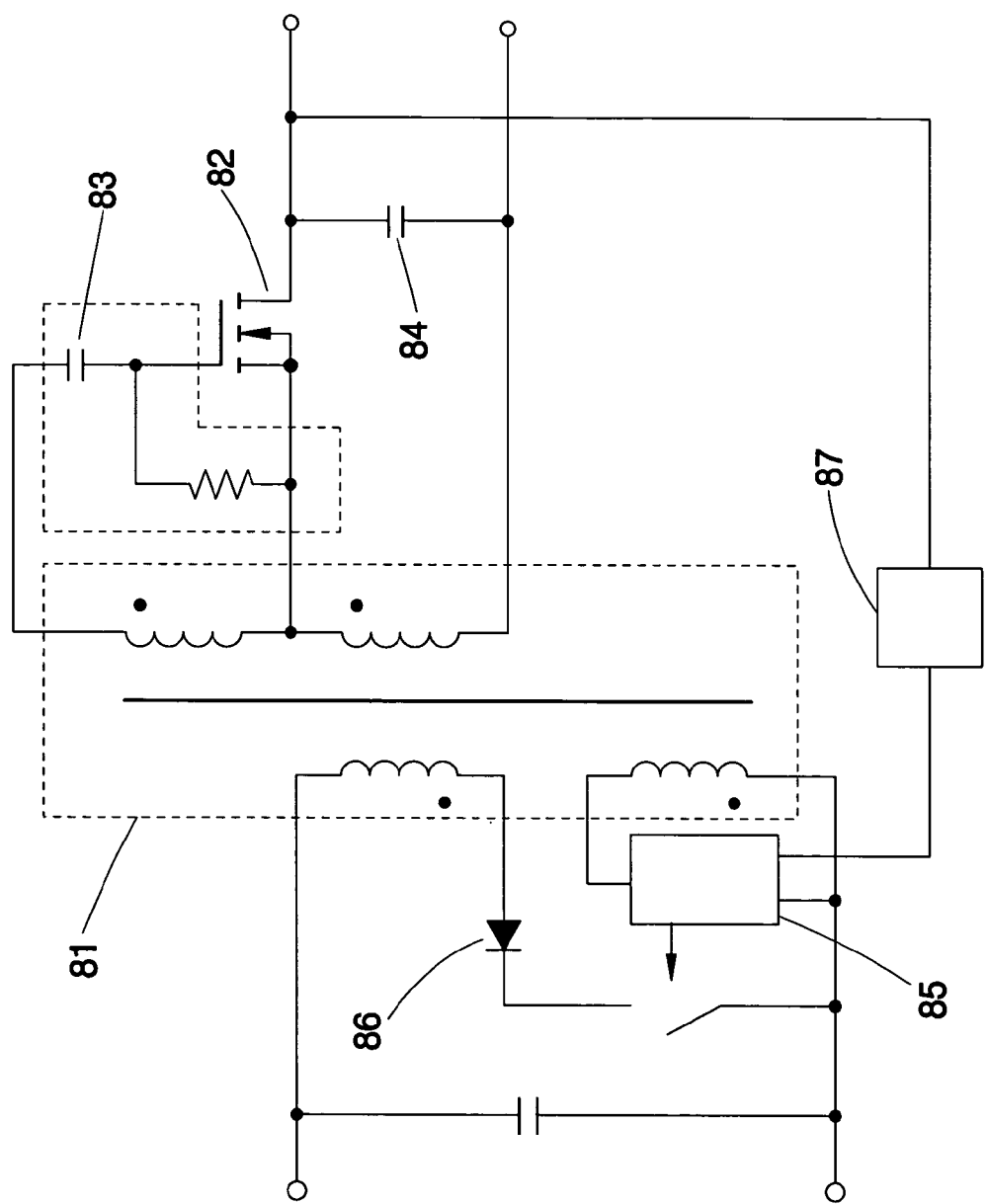
FIG. 7 is a circuit diagram of another prior art.

Referring to FIG. 5, the flyback converter 30 constructed according to a second preferred embodiment of the present invention is mostly the same as the first preferred embodiment but different only by that the source S of the MOSFET 35 is connected to the tertiary winding 33, the drain D of the MOSFET 35 is connected to the secondary winding 32, and the secondary winding 32, the MOSFET 35, and the tertiary winding 33 are connected in series. The operation of the flyback converter 30 is substantially identical to the flyback converter 10, such that no further recitation for the operation of the flyback converter 30 is required.

In conclusion, the present invention reduces the loss of the power energy via the capacitor C1 and the second resistor R2 and accelerates closing the MOSFET 25 via the first resistor R1. Further, the present invention is structurally simple, having less elements than the prior art, low-cost, highly efficient, and of high-speed working.

It is to be noted that the flyback converter of the aforementioned Japanese patent must combine the diode 86 and the frequency control 87 to control the conversion to further meet the requirements as mentioned above when it is in the heavy-load and light-load states. For the present invention, the MOSFET has the feature of its Vgs(th) to have continuous current and to work in CCM without the additional control circuit. Accordingly, the present invention is structurally simpler and more low-cost than the aforementioned Japanese patent.

What is claimed is:

1. A flyback converter comprising:
   a primary side and a secondary side,
   said primary side having a primary winding and a switch both connected in series, said secondary side having a secondary winding, a MOSFET (metal-oxide-semiconductor field-effect transistor) having a source connected to the second winding and a drain connected to a load, a tertiary winding connected between a gate and the source of the MOSFET, a first resistor connected between the gate and the source of the MOSFET and between a first end of the tertiary winding and a capacitor, and said capacitor connected between said gate and a second end of said tertiary winding,
   wherein when said switch on said primary side is turned on, the gate voltage of the MOSFET is induced by the tertiary winding to be negative such that the MOSFET is turned off,
   wherein when said switch on said primary side is turned off, the gate voltage of the MOSFET is induced by the tertiary winding to be positive such that the MOSFET is turned on, and
   wherein said resistor connected between the gate and source of the MOSFET increases said negative voltage to thereby accelerate turning-off of said MOSFET to prevent power losses when said switch on said primary side is turned on,
   whereby when said switch of said primary side is turned on/off, the power energy at said primary side can be transferred to said secondary side in a flyback manner.

2. The flyback converter as defined in claim 1, wherein said primary, secondary, and tertiary winding are coils located at two sides of a transformer, said primary winding being located at said primary side, said secondary and tertiary windings being located at said secondary side.

3. The flyback converter as defined in claim 1, wherein said secondary and tertiary windings are connected in series; said source of said MOSFET is connected between said secondary and tertiary windings.

4. The flyback converter as defined in claim 1, further comprising a second resistor connected in series with the first resistor, the capacitor, and the tertiary winding to suppress damping generated while the switch of said primary side is turned on and off.

* * * * *